United States Patent
Le Duff

(10) Patent No.: US 12,394,008 B2
(45) Date of Patent: Aug. 19, 2025

(54) DIGITAL WATERMARKING OF ACOUSTIC DATA

(71) Applicant: Evident Canada, Inc., Québec (CA)

(72) Inventor: Alain Le Duff, Quebec (CA)

(73) Assignee: Evident Canada, Inc., Québec (CA)

( * ) Notice: Subject to any disclaimer, the term of this patent is extended or adjusted under 35 U.S.C. 154(b) by 476 days.

(21) Appl. No.: 17/648,257

(22) Filed: Jan. 18, 2022

(65) Prior Publication Data

US 2022/0230265 A1    Jul. 21, 2022

Related U.S. Application Data

(60) Provisional application No. 63/139,127, filed on Jan. 19, 2021.

(51) Int. Cl.
| | |
|---|---|
| *G06T 1/00* | (2006.01) |
| *G01N 29/06* | (2006.01) |
| *G01N 29/24* | (2006.01) |
| *G10L 19/018* | (2013.01) |

(52) U.S. Cl.
CPC ......... *G06T 1/005* (2013.01); *G01N 29/0645* (2013.01); *G01N 29/2437* (2013.01); *G06T 1/0028* (2013.01); *G10L 19/018* (2013.01); *G01N 2291/0234* (2013.01); *G01N 2291/106* (2013.01); *G06T 2201/0052* (2013.01); *G06T 2201/0065* (2013.01); *G06T 2201/0202* (2013.01)

(58) Field of Classification Search
CPC .................. G10L 19/018; G01N 2291/044
USPC .......................................................... 700/94
See application file for complete search history.

(56) References Cited

U.S. PATENT DOCUMENTS

| | | | |
|---|---|---|---|
| 2007/0172094 A1* | 7/2007 | Ho | G06T 1/005 382/100 |
| 2014/0117073 A1* | 5/2014 | Bell | H04L 12/1818 235/375 |
| 2016/0093309 A1* | 3/2016 | Nakamura | G10L 19/018 700/94 |
| 2017/0323663 A1* | 11/2017 | Boykin | G08B 13/19613 |
| 2018/0211354 A1* | 7/2018 | Kim | G06T 1/0028 |
| 2019/0110096 A1* | 4/2019 | Shaw | H04N 21/2668 |
| 2022/0230265 A1* | 7/2022 | Le Duff | G06F 21/16 |

OTHER PUBLICATIONS

Langelaar, G C, et al., "Watermarking Digital Image and Video Data. A State-of-Art Overview", IEEE Signal Processing Magazine, (2000), 20-46.

(Continued)

*Primary Examiner* — Alexander Krzystan
(74) *Attorney, Agent, or Firm* — Schwegman Lundberg & Woessner, P.A.

(57) ABSTRACT

Examples described herein include adding a digital watermark into acoustic data. For example, the digital watermark data can be embedded using a key such that the watermark data is spread across a spectrum of the acoustic data. Thus, the data for the digital watermark may have no or minimal visible impact in the images generated using the marked acoustic data. The digital watermark may provide improved security and privacy. Moreover, the digital watermark may be incorporated into the reconstruction process of images.

20 Claims, 8 Drawing Sheets

(56) References Cited

OTHER PUBLICATIONS

Le Duff, A, et al., "Insertion d'informations numériques dans un signal : Application à la classi?cation de données expérimentales en anémométrie laser Doppler", Conference: 20° Colloque sur le traitement du signal et des images, with English abstract, (2005), 942-945.

* cited by examiner

DIGITAL WATERMARKING OF ACOUSTIC DATA

CROSS-REFERENCE TO RELATED APPLICATION

This application claims the benefit of priority to U.S. Provisional Patent Application Ser. No. 63/139,127, filed Jan. 19, 2021, the contents of which are incorporated herein by reference.

TECHNICAL FIELD

The present disclosure generally relates to embedding digital watermarks into data, such as acoustic data.

BACKGROUND

Ultrasonic inspection can be a useful inspection technique for a variety of structures. Inhomogeneities on or within the structure under test can generate scattered or reflected acoustic signals in response to a transmitted acoustic pulse. Such acoustic "echoes" can be received and processed. The processing can include reconstruction of an image corresponding to a region of the structure under test, for review by an inspector or for archival.

Processing of received acoustic echo signals to form images can involve various techniques. In one approach, a technique called a "total focusing method" (TFM) can be used, which can involve a full-matrix capture (FMC) acquisition scheme where focus can be achieved across a broad spatial region on or within a structure under test. The TFM images or FMC data, for example, can be relatively unprotected, meaning that they can be corrupted, intentionally or accidentally, or copied by others without being traceable. Thus, the integrity of the data can be compromised by improper data copying.

BRIEF DESCRIPTION OF THE DRAWINGS

Various ones of the appended drawings merely illustrate example implementations of the present disclosure and should not be considered as limiting its scope.

DETAILED DESCRIPTION

Figure 1:
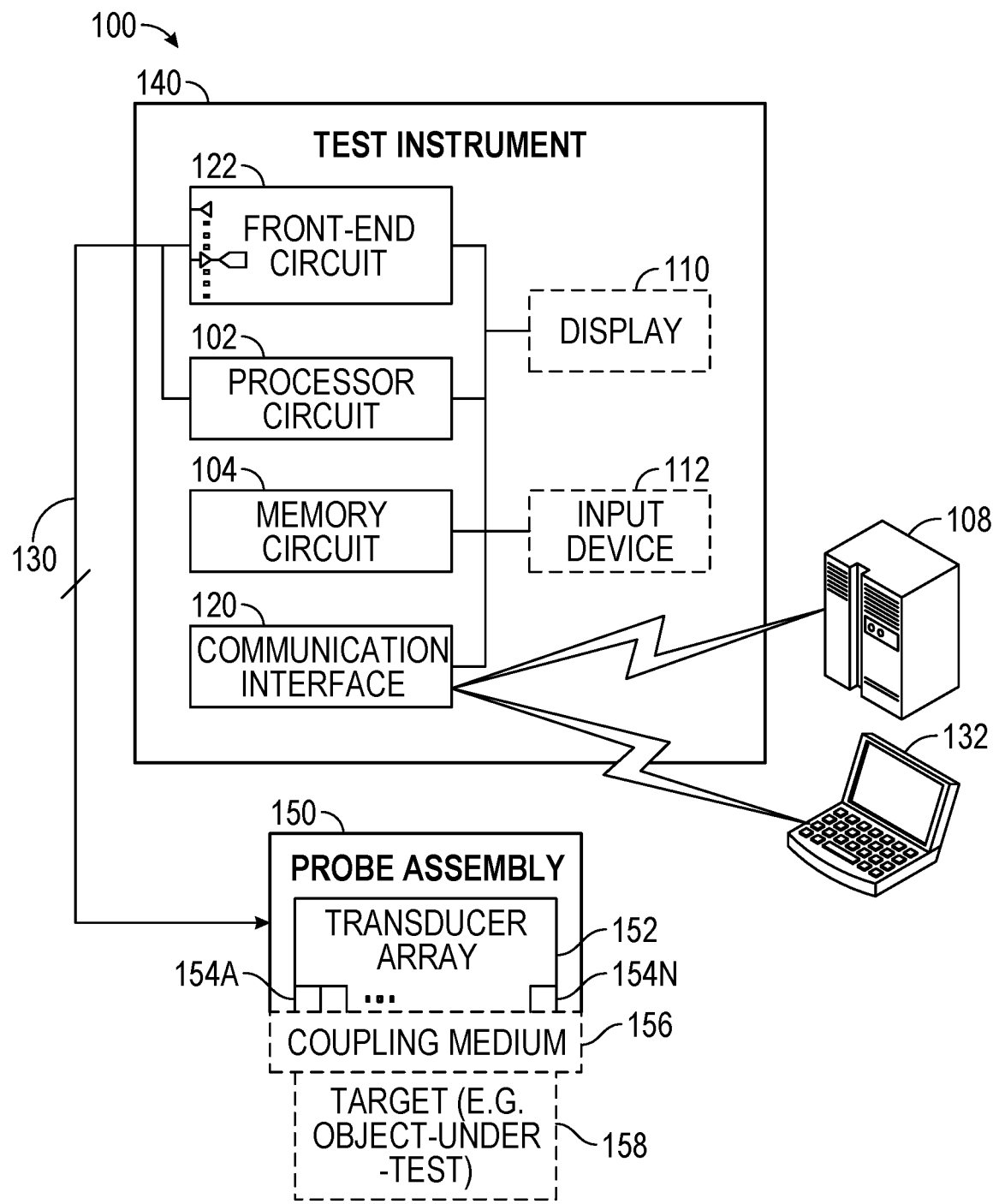
FIG. 1 illustrates an inspection system, according to an example of the present subject matter.

The inventor has recognized, among other things, a need in the art for techniques to embed a digital watermark into acoustic data without significantly impacting images generated from the acoustic data. Examples described herein include adding a digital watermark into acoustic data. For example, the digital watermark data can be embedded using a key such that the watermark data is spread across a spectrum of the acoustic data. Thus, the data for the digital watermark may not be visible in the images generated using the marked acoustic data. The digital watermark may provide improved security and privacy. Moreover, the digital watermark may be incorporated into the reconstruction process of images. For example, the digital watermark may include comments that may be needed to reconstruct images from the marked acoustic data.

This document describes a method comprising: arranging acoustic data into a first volume of slices; for each of a set of slices: transforming a respective slice into a frequency domain representation using a discrete transform to obtain a respective transformed slice, embedding a portion of a digital watermark into the transformed slice, wherein the digital watermark is based on a key, and applying an inverted form of the discrete transform to the transformed slice with the embedded portion of the digital watermark to generate a respective marked slice; arranging respective marked slices with respective embedded portions of the digital watermark into a second volume of marked slices; and generating an image based on the second volume of marked slices.

This document describes a method comprising: receiving acoustic echo data comprising time-series representations of acoustic echo signals obtained using an acoustic transducer array; aggregating the received acoustic data into a first three-dimensional matrix of echo data samples; for each of a set of two-dimensional slices from the first matrix: transforming a respective slice into a frequency domain representation using a discrete transform to obtain a respective transformed slice, embedding a portion of a digital watermark into the transformed slice, the digital watermark based on a key, and applying an inverted form of the discrete transform to the transformed slice with the embedded portion of the digital watermark to generate a respective marked slice; arranging respective marked slices with respective embedded portions of the digital watermark into a second three-dimensional matrix of echo data samples; and generating an image based on the second matrix.

This document further describes a system with one or more processors of a machine. The system also includes a memory storing instructions that, when executed by the one or more processors, cause the machine to perform operations comprising: arranging acoustic data into a first volume of slices; for each of a set of slices: transforming a respective slice into a frequency domain representation using a discrete transform to obtain a respective transformed slice, embedding a portion of a digital watermark into the transformed slice, wherein the digital watermark is based on a key, and applying an inverted form of the discrete transform to the transformed slice with the embedded portion of the digital watermark to generate a respective marked slice; arranging respective marked slices with respective embedded portions of the digital watermark into a second volume of marked slices; and generating an image based on the second volume of marked slices.

FIG. 1 illustrates generally an example comprising an acoustic inspection system 100, such as can be used to perform one or more techniques showed and described elsewhere herein. The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with different probe assemblies 150. Generally, the transducer array 152 includes piezoelectric transducers, such as can be acoustically coupled to a target 158 (e.g., an object under test) through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front end-circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

While FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

Figure 2:
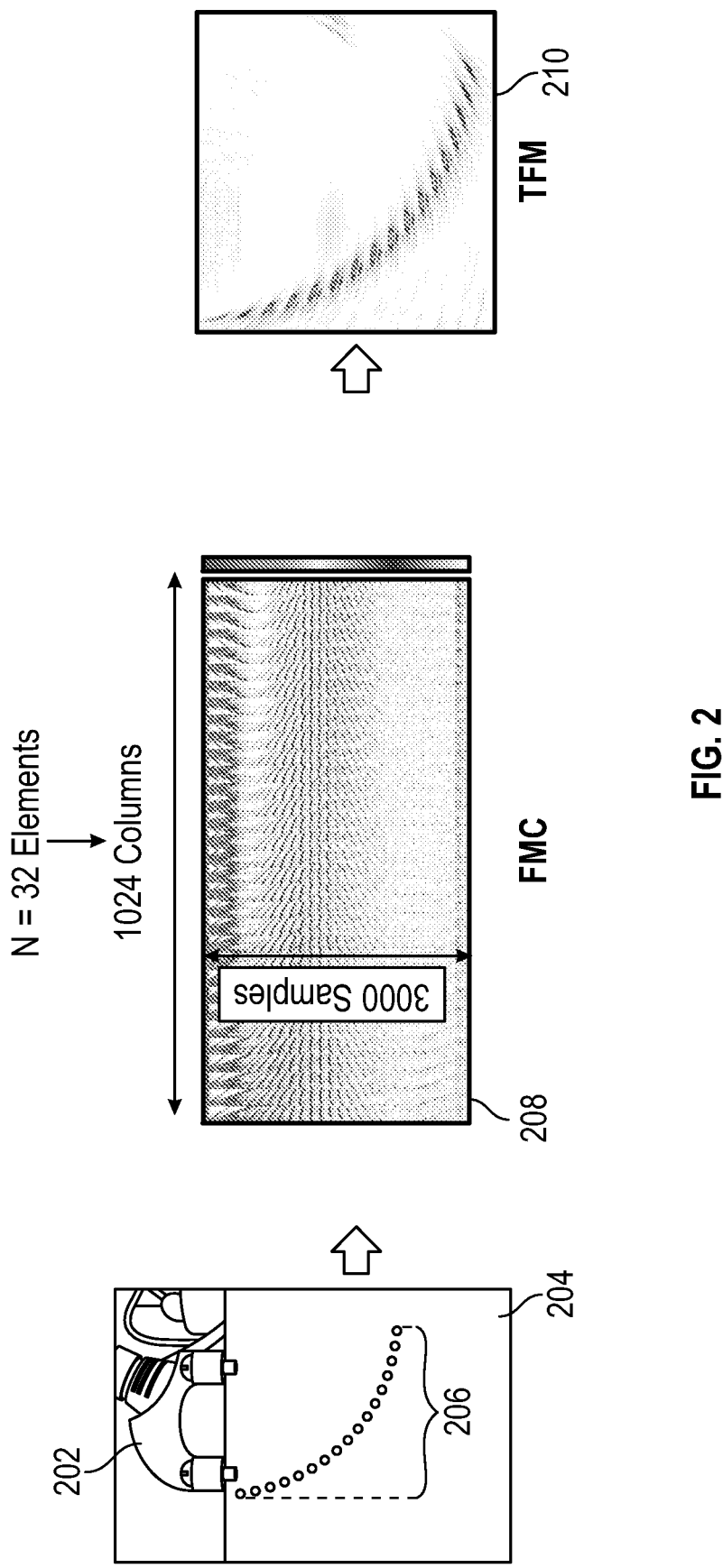
FIG. 2 illustrates an inspection process, according to an example of the present subject matter.

FIG. 2 illustrates an inspection process, according to an example of the subject matter. Using an inspection probe 202, as described above, a scan may be performed on an object 204. In this example, the object 204 is illustrated as a block (e.g., steel) with a plurality of side drilled holes 206. The inspection probe 202 may include a plurality of transducer elements (e.g., transducer array). In this example, the inspection probe 202 may include N transmitting elements (N=32) and M receiving elements (M=32). The inspection probe 202 may capture acoustic data 208, which may include A-scan time-series representations of acoustic echo signals. The acoustic data 208 captured by the inspection probe 202 may be in the form of FMC data, for example. Here, the acoustic data 208 (e.g., FMC data) may include 1024 columns (N×M, which in this example is 32×32) with each column including approximately 3000 samples; each column may represent an A-scan. The acoustic data 208 may be then used to generate an image 210, such as a TFM image. Here, the image 210 illustrates echo representations of the side drilled holes 206 in the object 204.

Next, techniques to embed a digital watermark in acoustic data will be described. The digital watermark may have no or minimal impact on the final image(s) generated using the acoustic data.

Figure 3:
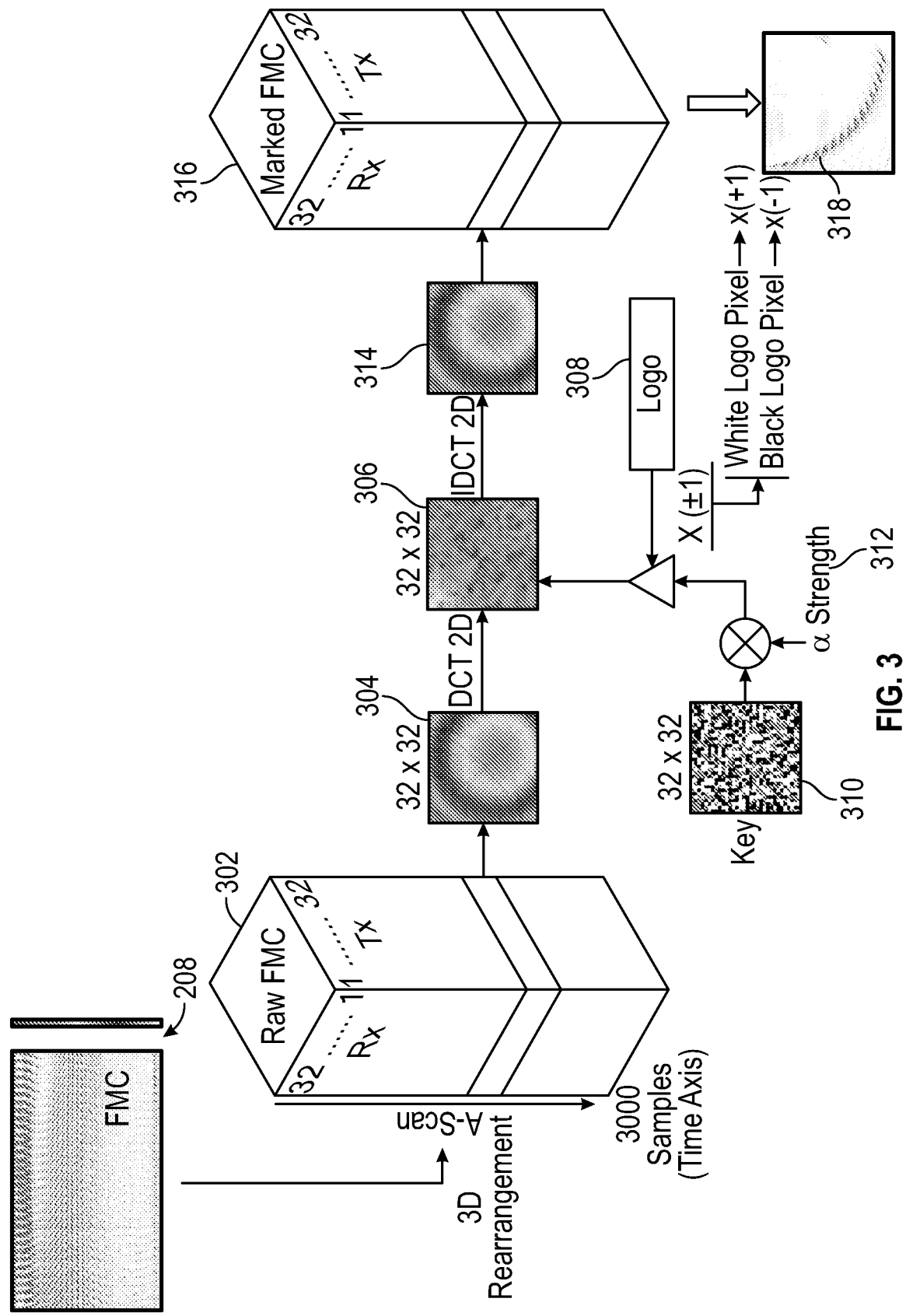
FIG. 3 illustrates a process to embed a digital watermark into acoustic data, according to an example of the present subject matter.

FIG. 3 illustrates a process to embed a digital watermark into acoustic data, according to an example of the present subject matter. First, acoustic data 208, which may be in the form of FMC data, or may be rearranged into a 3D arrangement, such as a 3D matrix of echo data samples (3D FMC data 302). The value of the data may be the same but rearranged in a 3D representation. In an example, the acoustic data 208 may undergo pre-processing, such as data enhancement. The 3D FMC data 302 may be provided as a plurality of 2D slices (3000 slices which may correspond to the number of samples). In this example, each slice is 32×32, where 32 represents the number of transmitting and receiving elements (N×M) of the inspection probe used to capture the acoustic data. Other transmitting and receiving element configurations may also be used.

A digital watermark may be embedded and distributed across the slices. In one example, the digital watermark may be distributed across all the slices in the 3D FMC data 302. In another example, the digital watermark may be distributed across a select set of slices, and not all slices. In this example, portions of the digital watermark may be added to each of the selected slices.

Each slice 304 of the selected set may be transformed from the time domain to the frequency domain. For example, a 2D discrete cosine transform (DCT) may be applied to the slice 304 to generate a transformed slice 306 as a frequency domain representation. Other transform functions, such as Fourier, wavelet, etc., may also be used.

A portion of a digital watermark 308 may be embedded into the transformed slice 306. For example, a pixel of the digital watermark 308 (e.g., bitmap "Logo") may be embedded into the transformed slice 306. To insert the pixel of digital watermark 308, a key 310 may be used. The key 310 may be the same size as the transformed slice 306, N×M (e.g., 32×32). The key 310 may include an image representation of randomly generated numbers or digits (e.g., +1, 0, −1), such as a bitmap representation of a random pattern or random pixel values. For example, a +1 digit may be represented by a black pixel, a −1 digit may be represented by a white pixel, and a 0 digit may be represented by a gray pixel. Other color pixels and pixel values may also be used. For example, the key may be represented by other values between 0 and 1, where its value may reflect the visibility of the mark. In another example, the key may be represented by values ranging from −x to +x, where x is an integer.

The key 310 may be defined in a manner to lessen its impact on the acoustic data. For example, in a transformed slice (e.g., 306), the upper left pixels may include relatively low-frequency information and the bottom right pixels may include relatively high-frequency information. Therefore, the key 310 may be defined to lower its impact in the upper left pixels, which include relatively low-frequency information. For example, the key 310 may concentrate "0" values (e.g., gray pixels) in the upper left pixels to reduce the impact of embedding the key 310 on the acoustic data. Conversely, the key 310 may include more robust key information in the bottom right pixels, which may include relatively high-frequency information.

The key 310 may be multiplied by a strength coefficient (a) 312. In an example, the strength coefficient 312 may be pre-set. In another example, the strength coefficient 312 may be programmed or set based on the acoustic data. A signal-to-noise ratio or other indicium of quality of a recovered digital watermark may be related to the strength coefficient 312; for example, the visibility of the digital watermark may be related to the strength coefficient 312. A relatively higher strength coefficient 312 may correspond to a more clearly discernable (e.g., more visible) recovered digital watermark and a relatively lower strength coefficient 312 may correspond to a comparatively noisier digital watermark (e.g., less visible). In one example, the value of the strength coefficient 312 may be adjusted based on the content of the respective slice 304. For example, for certain slices, such as those with more relevant acoustic data, a relatively lower strength coefficient 312 may be applied, and for other slices, such as those with less relevant acoustic data, a relatively higher strength coefficient 312 may be applied. Energy of the slice may be measured, and based on the measured energy, the value of the strength coefficient 312 for that respective slice may be set.

The key 312 may then be combined with the transformed slice. For example, the key 312 may be added or subtracted from the transformed slice 306 based on the portion of the digital watermark 308 to be added to the respective slice. For instance, if the portion of the digital watermark 308 corresponds to a white pixel (e.g., white pixel in "Logo" bitmap), then the key 312 may be added to the transformed slice 306. Conversely, if the portion of the digital watermark 308 to the slice 304 corresponds to a black pixel (e.g., black pixel in "Logo" bitmap), then the key 312 may be subtracted from the transformed slice 306.

After the key 312 has been inserted into the transformed slice 306 based on the respective portion of the digital watermark 306, the transformed slice 306 may then transformed back from the frequency domain into the time domain using an inverse function of the function used to transform the slice 304 to generate a marked slice 314. For example, if a 2D DCT was applied, then an inverse DCT (IDCT) may be applied to generate the marked slice. The marked slice 304 may include information regarding the added portion of the digital watermark 308 based on the key 310.

This process may be repeated for the set of slices in the 3D FMC data 302 until the digital watermark 308 is completely added to generate marked 3D FMC data 316. In one example, as described above, portions of the digital watermark 308 may be added using key 310 (with strength coefficient 312) to all slices of the 3D FMC data 302. If the 3D FMC data 302 includes 3000 samples and information of one pixel of the digital watermark 308 can be embedded into each slice, then a 3000-pixel mark may be embedded.

Alternatively, information regarding the digital watermark 308 may be embedded into a selected set of slices of the 3D FMC data 302. The slices to be marked may be selected based on their acoustic data content. For example, slices with less relevant acoustic data may be selected for digital watermarking while slices with more relevant acoustic data may not be selected for digital watermarking. Relevancy of the acoustic data may be determined using different techniques. Energy of the slice may be measured, and based on the measured energy, the slice may be selected for watermark embedding. In one example, the last set of samples of 3D FMC data 302 may not be used to generate a TFM image; therefore, the digital watermark information may be embedded in those last set of samples.

In any event, the digital watermark 308 may be distributed across a frequency spectrum to make minimal visible impact in image(s) generated using the marked acoustic data. The marked 3D FMC data 316 may be then used to generate an image 318, such as a TFM image. The image 318 may display the echo representations in the acoustic and may include information regarding the embedded digital watermark 308, but that watermark information may have no or minimal visible impact on the display of the echo representations.

Figure 4:
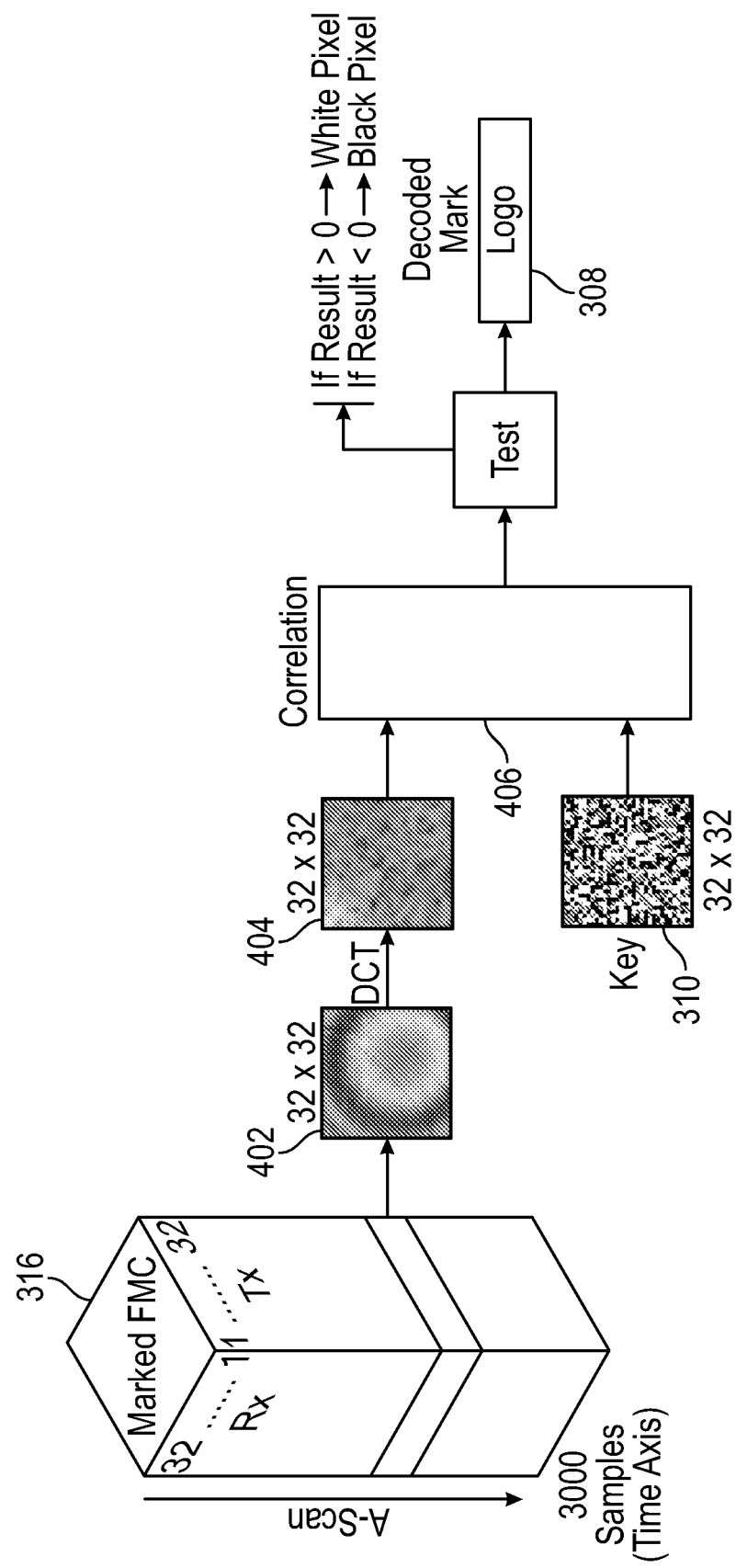
FIG. 4 illustrates a process to extract a digital watermark from marked acoustic data, according to an example of the present subject matter.

Next, techniques to extract and decode a digital watermark will be described. FIG. 4 illustrates a process to extract a digital watermark from marked acoustic data, according to an example of the present subject matter. For extraction, the marked acoustic data such as marked 3D FMC data 316 may be provided. Each slice 402 of the marked 3D FMC data 316 of the selected set may be transformed from the time domain representation to frequency domain representation. The same transform function used to embed the digital watermark, as described above with reference to FIG. 3, may be used here in the extraction process. For example, a 2D discrete cosine transform (DCT) may be applied to the slice 402 to generate a transformed slice 404. Other transform functions, such as Fourier, wavelet, etc., may also be used.

Each transformed slice 404 may then be applied to a correlation function 406 with the key 310 (the same key used for embedding the digital watermark). The correlation function 406 may determine a degree of correlation between the transformed slice 404 and the key 310. Based on the result of the correlation function 406 (e.g., degree of correlation), the portion of the digital watermark 308 embedded in the respective transformed slice 404 may be established. Consider the example described above: for white pixels of the digital watermark 308, the key 310 was added to the respective transformed slices 306; for black pixels of the digital watermark 308, the key 310 was subtracted from the respective transformed slices 306. In this example, if the result of the correlation function 406 is positive (greater than zero), it may correspond to a white pixel for the digital watermark; if the result of the correlation function 406 is negative (less than zero), it may correspond to a black pixel for the digital watermark. This correlation procedure may be performed for all embedded slices and the results may be aggregated so that the embedded digital watermark may then be decoded and reconstructed accordingly.

Figure 5:
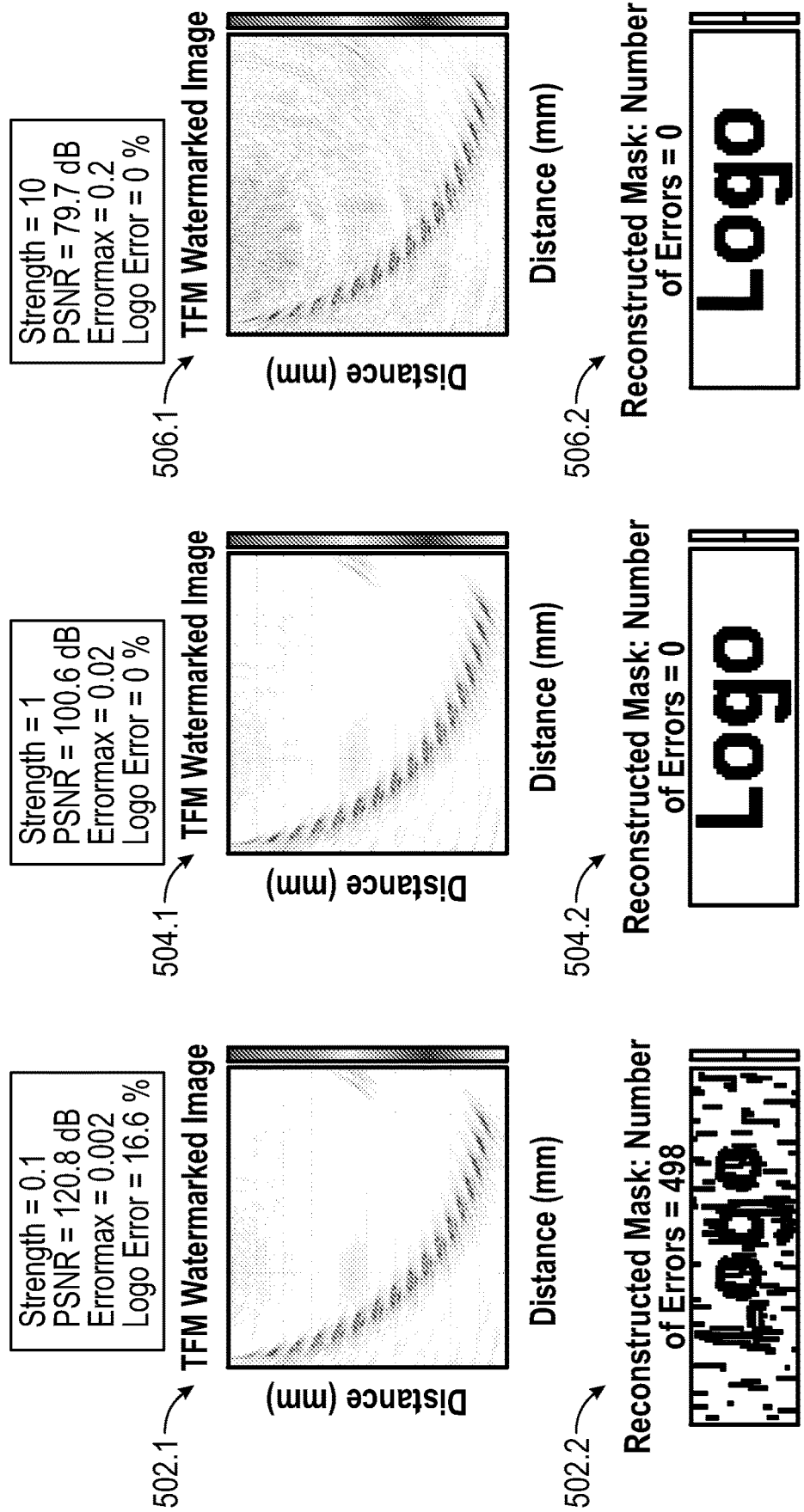
FIG. 5 illustrates three sample embedded TFM images and corresponding decoded digital watermarks with varying values of the strength coefficient, according to an example of the present subject matter.

As mentioned above, the strength coefficient (a) of the key used to embed the digital watermark may impact the visibility of the embedded information and the clarity of the decoded watermark. There can be a tradeoff between the clarity of the decoded digital watermark and the visible impact of the watermark. FIG. 5 illustrates three sample embedded TFM images and corresponding decoded digital watermarks with varying values of the strength coefficient. The first sample TFM image 502.1 was embedded with the digital watermark information with the strength coefficient set at 0.1. Here, the relatively low strength coefficient shows minimal to no visible impact to the TFM image 502.1, but the clarity of the decoded digital watermark 502.2 is low. This is because decoding a relatively low-strength embedded watermark may be more prone to error. For example, here the logo error was measured to be about 16.6% and the Peak Signal to Noise Ratio (PSNR) was measured to be about 120.8 dB.

The second sample TFM image 504.1 was embedded with the digital watermark information with the strength coefficient set at 1. Here, the set strength coefficient shows minimal to no visible impact to the TFM image 504.1 (like the first sample TFM image), but, unlike the first sample TFM image, the clarity of the decoded digital watermark 504.2 is high. Indeed, the measured logo error measured to be about 0% and the PSNR was measured to be about 100.6 dB.

The third sample TFM image 506.1 was embedded with the digital watermark information with the strength coefficient set at 10. Here, the clarity of the decoded digital watermark 506.2 is high. The measured logo error measured to be about 0% and the PSNR was measured to be about 100.6 dB. But appreciable visible impact to the TFM image 506.1 can be seen. This shows the tradeoff of using high strength coefficients when embedding the digital watermark using the techniques described herein.

As mentioned above, the value of the strength coefficient (a) may be varied or adjusted during the embedding process. For example, the energy of each transformed slice to be embedded may be measured, and based on the measured amount of energy, the value of the strength coefficient may be adjusted. For slices with relatively higher amounts of energy, the strength coefficient may set to a relatively lower value, and for slices with relatively lower amounts of energy, the strength coefficient may be set to a relatively higher value.

The digital watermark may be provided in different forms. For example, the digital watermark may be provided as a bitmap (e.g., binary image of "Logo"). In another example, the digital watermark may be a photograph or an image. The digital watermark may also be provided as text or code represented as a binary signal. For example, an ASCII character may be coded to 8 bits, i.e., 8 pixels (e.g., 0=black and 1=white).

In addition to providing security, the digital watermark may also include information related to constructing an image (e.g., TFM image) from the acoustic data. For example, the digital watermark may include metadata information encoded for storage as a portion of a digital watermark, such as representing number of elements used in inspection, a test configuration, etc. The metadata may include traceability information relating to specific site conditions, or data relating to an object-under-test such as physical coordinates or other identifying data indicative of a test location. Metadata may be used to construct an image from the marked acoustic data or to modify such construction of an image. In this example, the embedded digital watermark may be extracted and decoded first, and then the extracted information from the embedded digital watermark may be used to construct an image from the marked acoustic data.

Figure 6A:
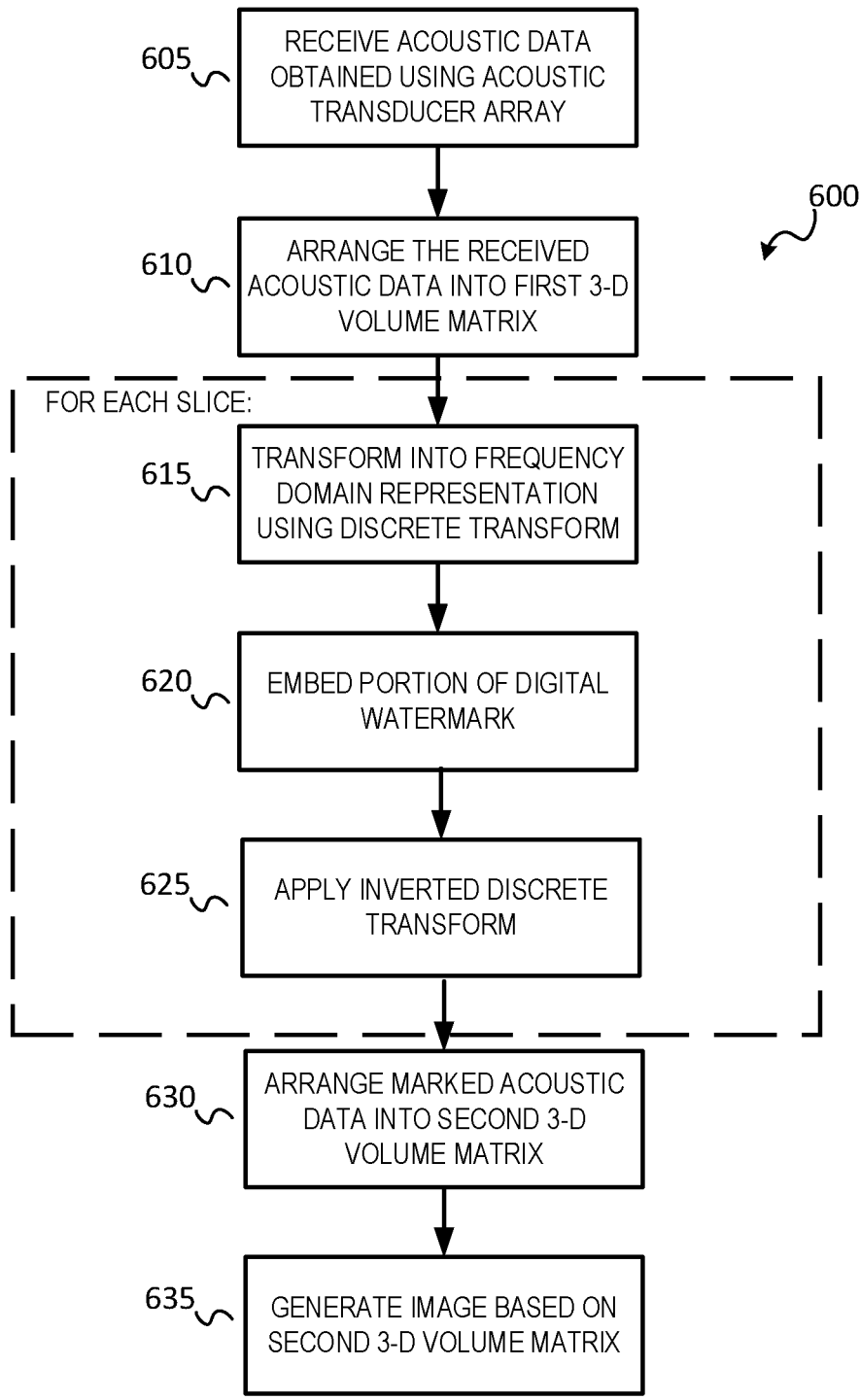
FIG. 6A illustrates a flow diagram of a method for embedding a digital watermark, according to an example of the present subject matter.

FIG. 6A illustrates a flow diagram of a method 600 for embedding a digital watermark, according to an example of the present subject matter. At 605, acoustic data obtained using an acoustic transducer array may be received. The acoustic data may include time-series representations of acoustic echo signals obtained using an acoustic transducer array, such as FMC data. In an example, the acoustic data may undergo pre-processing, such as data enhancement. At 610, the received acoustic data may be arranged into a first volume of slices. For example, the received acoustic data into a three-dimensional volume matrix of echo data samples. For each of a set of two-dimensional slices of the first volume: at 615, a respective slice may be transformed into a frequency domain representation using a discrete transform to obtain a respective transformed slice; at 620, a portion of a digital watermark may be embedded into the transformed slice, the digital watermark may be based on a key; and at 625, an inverted form of the discrete transform may be applied to the transformed slice with the embedded portion of the digital watermark to generate a respective marked slice. At 630, the respective marked slices with respective embedded portions of the digital watermark may be arranged into a second volume of marked slices. For example, exampled the marked slices may be arranged into second three-dimensional matrix of echo data samples. At 635, an image may be generated based on the second volume of marked slices (e.g., second matrix of echo data samples).

Figure 6B:
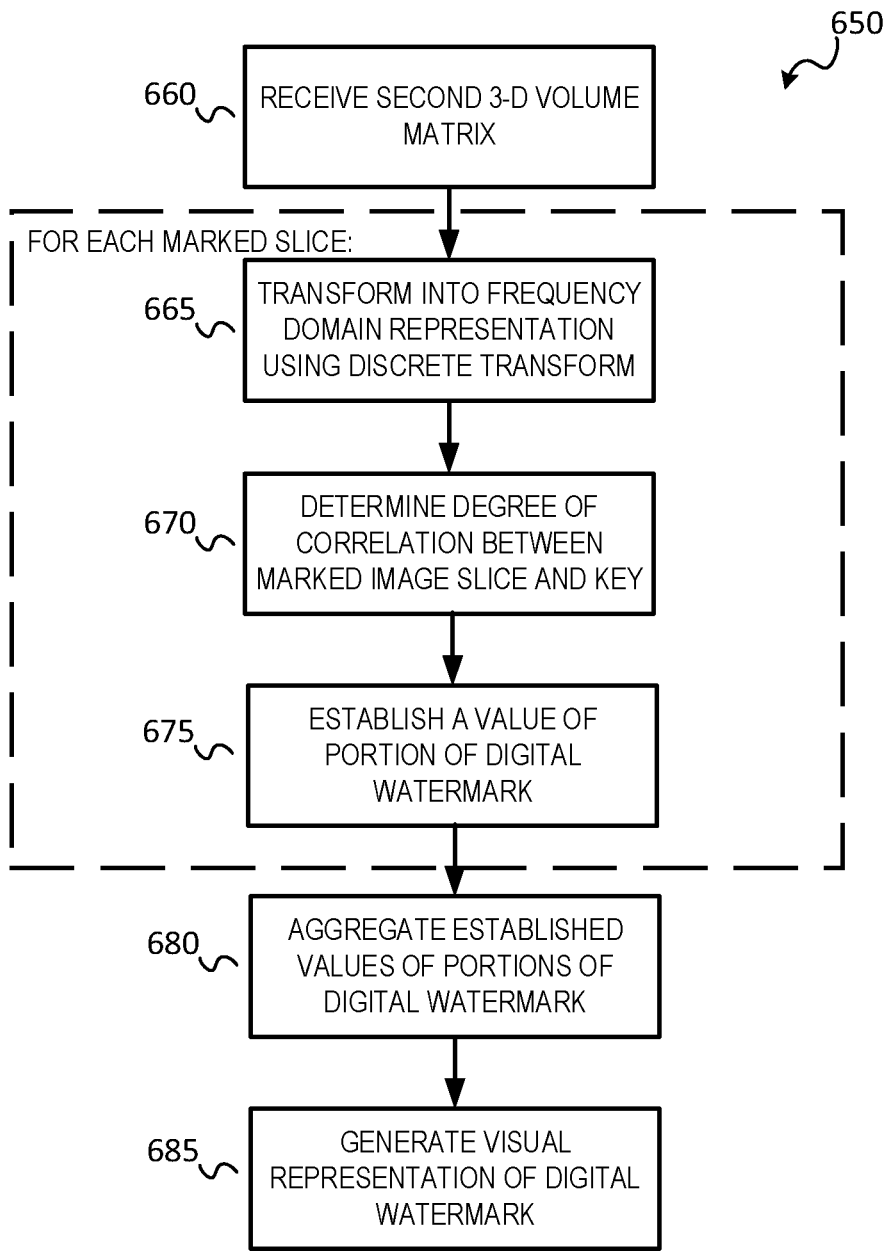
FIG. 6B illustrates a flow diagram of a method for extracting an embedded digital watermark, according to an example of the present subject matter.

FIG. 6B illustrates a flow diagram of a method 650 for extracting an embedded digital watermark, according to an example of the present subject matter. At 660, the second volume of marked slices (e.g., second matrix of echo data samples) may be received. For each marked slice: at 665, a respective marked slice may be transformed into a frequency domain representation using a discrete transform to obtain a respective transformed marked slice; at 670, a degree of correlation between the transformed marked slice and the key used to embed the digital watermark may be determined; and at 675, based on the degree of correlation, a value of a portion of the digital watermark for the respective slice may be established. Correlation may be a statistic method (e.g., sum of product) that measures the degree of similarity between to items (e.g., signal, image). In an example, the result of the correlation may fall between 0 and +1. At 680, the established values of portions of the digital watermark may be aggregated. At 685, a visual representation of the digital watermark may be generated based on the aggregated established values.

Figure 7:
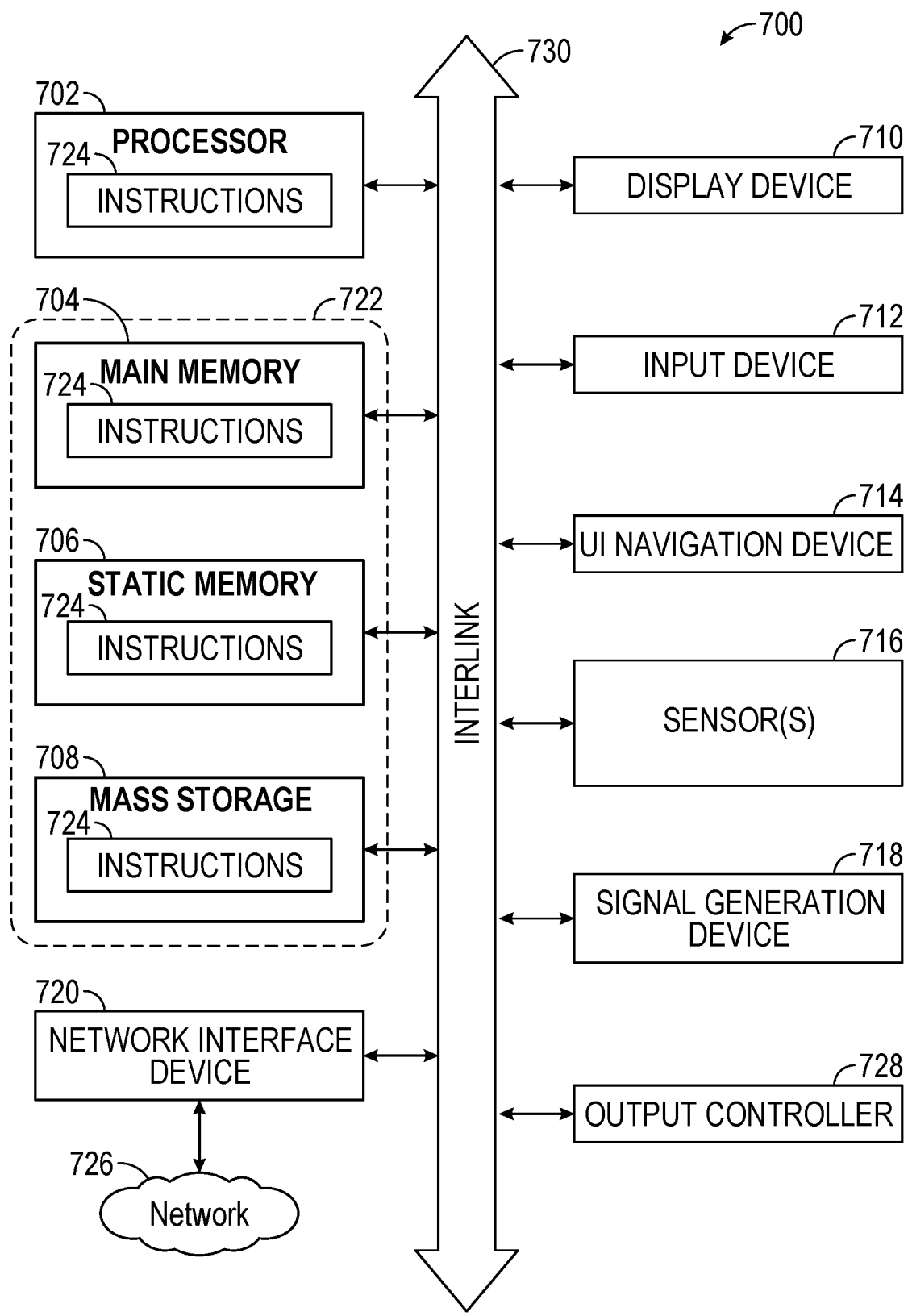
FIG. 7 illustrates a block diagram of an example comprising a machine upon which any one or more of the techniques (e.g., methodologies) discussed herein may be performed.

The techniques shown and described in this document can be performed using a portion or an entirety of an inspection system 100 as shown in FIG. 1 or otherwise using a machine 700 as discussed below in relation to FIG. 7. FIG. 7 illustrates a block diagram of an example comprising a machine 700 upon which any one or more of the techniques (e.g., methodologies) discussed herein may be performed. In various examples, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 720, an alphanumeric input device 722 (e.g., a keyboard), and a user interface (UI) navigation device 724 (e.g., a mouse). In an example, the display unit 720, input device 722 and UI navigation device 724 may be a touch screen display. The machine 700 may additionally include a storage device (e.g., drive unit) 726, a signal generation device 728 (e.g., a speaker), a network interface device 720, and one or more sensors 722, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 726 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 707, or the storage device 726 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.22 family of standards known as Wi-Fi®, IEEE 802.26 family of standards known as WiMax®), IEEE 802.25.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method comprising:
providing acoustic data comprising time-series representation of acoustic echo signals from an object under inspection using an acoustic transducer array, the acoustic data being arranged in a 3D arrangement;
generating a first volume of slices based on the acoustic data, the first volume slices comprising 2D slices, wherein a parameter of the 2D slices is based on a number of elements of the acoustic transducer array;
for each of the first volume of slices:
transforming a respective slice into a frequency domain representation using a discrete transform to obtain a respective transformed slice,
embedding a portion of a digital watermark into the transformed slice, wherein the digital watermark is based on a key, the embedding comprising:
determining an energy level of the transformed slice, and
setting a strength coefficient for application of the key for the transformed slice based on the energy level of the transformed slice, and
applying an inverted form of the discrete transform to the transformed slice with the embedded portion of the digital watermark to generate a respective marked slice;
arranging respective marked slices with respective embedded portions of the digital watermark into a second volume of marked slices; and
generating an image based on the second volume of marked slices, wherein the image illustrates echo representations from the object.

2. The method of claim 1, further comprises:
extracting the embedded digital watermark from the second volume of marked slices to generate a visual representation of the digital watermark.

3. The method of claim 2, wherein extracting the embedded digital watermark includes
for each of a set of marked slices:
transforming a respective marked slice into the frequency domain representation to obtain a respective transformed marked slice,
determining a degree of correlation between the transformed marked slice and the key to generate a correlation result, and
based on the degree of correlation, establish a value of the portion of the recovered digital watermark;
aggregating the respective established values of portions of the recovered digital watermark; and
generating a visual representation of the recovered digital watermark based on the aggregated established values.

4. The method of claim 1, wherein embedding the portion of the digital watermark into the transformed slice comprises:
based on a value of the portion of the digital watermark, combining the key with the transformed slice.

5. The method of claim 4, further comprising:
based on the value of the portion of the digital watermark being a first type, adding the key to the transformed slice; and
based on the value of the portion of the digital watermark being a second type, subtracting the key from the transformed slice.

6. The method of claim 1, wherein the key includes a bitmap representation.

7. The method of claim 6, wherein the bitmap representation comprises at least one of a random pattern or random pixel values.

8. The method of claim 1, wherein the digital watermark is a binary bitmap.

9. A method comprising:
providing acoustic echo data comprising time-series representations of acoustic echo signals from an object under inspection obtained using an acoustic transducer array;
aggregating the received acoustic data into a first three-dimensional matrix of echo data samples;
generating a set of two-dimensional slices from the matrix, wherein a parameter of the two-dimensional slices is based on a number of elements of the acoustic transducer array;
for each of the set of two-dimensional slices from the first matrix:
transforming a respective slice into a frequency domain representation using a discrete transform to obtain a respective transformed slice,
embedding a portion of a digital watermark into the transformed slice, the digital watermark based on a key, the embedding comprising:
determining an energy level of the transformed slice, and
setting a strength coefficient for application of the key for the transformed slice based on the energy level of the transformed slice, and
applying an inverted form of the discrete transform to the transformed slice with the embedded portion of the digital watermark to generate a respective marked slice;
arranging respective marked slices with respective embedded portions of the digital watermark into a second three-dimensional matrix of echo data samples; and
generating an image based on the second matrix, wherein the image illustrates echo representations from the object.

10. The method of claim 9, wherein the matrix of echo data sample comprises a matrix of A-scan time-series representations of received acoustic echo data.

11. The method of claim 9, wherein the generating the image comprises applying a total focusing method (TFM) imaging technique to the second volume of marked slices to generate the image.

12. The method of claim 9, further comprises
extracting the embedded portions of the digital watermark from the second matrix to generate a visual representation of the digital watermark.

13. A system comprising:
one or more processors of a machine; and
a memory storing instructions that, when executed by the one or more processors, cause the machine to perform operations comprising:
providing acoustic data comprising time-series representation of acoustic echo signals from an object under inspection using an acoustic transducer array, the acoustic data being arranged in a 3D arrangement;
generating a first volume of slices based on the acoustic data, the first volume slices comprising 2D slices, wherein a parameter of the 2D slices is based on a number of elements of the acoustic transducer array;
for each of the first volume of slices:
transforming a respective slice into a frequency domain representation using a discrete transform to obtain a respective transformed slice,
embedding a portion of a digital watermark into the transformed slice, wherein the digital watermark is based on a key, the embedding comprising:
determining an energy level of the transformed slice, and
setting a strength coefficient for application of the key for the transformed slice based on the energy level of the transformed slice, and
applying an inverted form of the discrete transform to the transformed slice with the embedded portion of the digital watermark to generate a respective marked slice;
arranging respective marked slices with respective embedded portions of the digital watermark into a second volume of marked slices; and
generating an image based on the second volume of marked slices, wherein the image illustrates echo representations from the object.

14. The system of claim 13, the operations further comprises:
extracting the embedded digital watermark from the second volume of marked slices to generate a visual representation of the digital watermark.

15. The system of claim 14, wherein extracting the embedded digital watermark includes
for each of a set of marked slices:
transforming a respective marked slice into the frequency domain representation to obtain a respective transformed marked slice,
determining a degree of correlation between the transformed marked slice and the key to generate a correlation result, and based on the degree of correlation, establish a value of the portion of the recovered digital watermark;

aggregating the respective established values of portions of the recovered digital watermark; and generating a visual representation of the recovered digital watermark based on the aggregated established values.

16. The system of claim 13, wherein embedding the portion of the digital watermark into the transformed slice comprises:

based on a value of the portion of the digital watermark, combining the key with the transformed slice.

17. The system of claim 16, the operations further comprising:

based on the value of the portion of the digital watermark being a first type, adding the key to the transformed slice; and based on the value of the portion of the digital watermark being a second type, subtracting the key from the transformed slice.

18. The system of claim 13, wherein the key includes a bitmap representation.

19. The system of claim 18, wherein the bitmap representation comprises at least one of a random pattern or random pixel values.

20. The system of claim 13, wherein the digital watermark is a binary bitmap.

\* \* \* \* \*